Jan. 9, 1934.  C. L. KNUTSON  1,943,262
CONDUIT HOLDING DEVICE
Filed Dec. 10, 1931
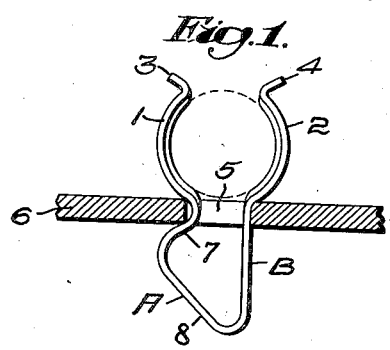
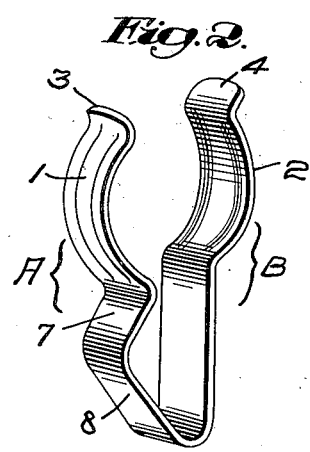
Inventor:
Carl L. Knutson,
by Emery Booth Varney & Townsend
Attys Patented Jan. 9, 1934

1,943,262

UNITED STATES PATENT OFFICE 1,943,262

CONDUIT-HOLDING DEVICE

Carl L. Knutson, Maywood, Ill., assignor to United-Carr Fastener Corporation, Cambridge, Mass., a corporation of Massachusetts Application December 10, 1931
Serial No. 580,088

5 Claims. (Cl. 24—73)

My invention aims to provide improvements in snap fastener secured conduit-holding devices.

In the drawing which illustrates a preferred embodiment of my invention:—

Figure 1 is a section through an installation showing one embodiment of my invention and the use thereof, the device being shown in side elevation; and Fig. 2 is a perspective view of my improved device selected for illustration.

Referring now to the particular embodiment of my invention illustrated by the drawing, I have shown a device preferably formed from a single narrow strip of yieldable sheet metal and adapted to be quickly and easily installed to hold in place various types of conduits such as gasoline pipes, air pipes, electric wires, etc. One use of my improved device is as shown in Figure 1. In that figure the device is shown attached to an apertured structure and the conduit is shown in dotted lines.

The particular device shown is preferably made from a narrow strip of sheet metal bent approximately at the middle to provide two side portions A and B. The free end portions of the arms A and B are formed into curved portions 1 and 2 which oppose each other and provide means for receiving and holding a conduit between them. The extreme ends 3 and 4 of the arms A and B are flared outwardly to provide means for guiding a conduit into position between the curved portions 1 and 2.

Below the conduit-receiving means I have provided fastening means adapted to pass through an aperture 5 in the supporting structure 6 and hold the device in position. The particular fastening means illustrated is formed by bending the arm A in diverging relation to the arm B from their point of connection and then providing a hook portion 7 between the diverging portion 8 and the curved portion 1. This loop portion is adapted to snap into engagement with the material of the supporting structure 6 adjacent to the aperture 5 and hold the device in place. Therefore, I have provided a snap fastening male means as a part of the device which may be snapped into and out of the aperture 5 as desired.

To attach a conduit 9 (shown in dotted lines in Figure 1) to a structure 6 the device is preferably first snapped into the aperture 5 in the structure 6 and then a conduit is snapped into position between the curved portions 1 and 2, as illustrated in Figure 1. The conduit is thus securely held in position and the device cannot come loose while the conduit is thus held in position.

The device which I have illustrated and described is simple in construction, relatively inexpensive to manufacture and decidedly efficient for use in connection with securely holding conduits in desired installations.

While I have illustrated and described a preferred embodiment of my invention, I do not wish to be limited thereby, because the scope of my invention is best defined by the following claims.

I claim

1. A snap fastener secured conduit installation comprising, in combination, a supporting structure having an aperture therethrough, a snap fastener device comprising a pair of opposed yieldable portions joined together at one end and shaped and arranged nearest the joined end to provide contractible and expansible snap fastening means snapped through the aperture in said supporting structure and conduit-engaging means, formed at the free ends of said opposed yieldable portions at that side of the supporting structure from which the snap fastening means enters, adapted to hold a conduit in position adjacent to said supporting structure.

2. A snap fastener device of the class described formed from a single piece of sheet metal bent substantially at the middle to provide two yieldable portions, a conduit-engaging portion formed on each yieldable portion and cooperating to span a conduit and substantially V-shaped yieldable socket-engaging means formed as a part of said device adjacent to the end where the yieldable portions are joined.

3. A snap fastener device of the class described formed from a single narrow strip of sheet metal bent to form two yieldable portions, conduit-engaging means provided by bends in the said arms, socket-engaging means in said strip and a hook portion provided as a part of said socket-engaging means and located between one of the bends of the conduit-engaging means and the adjacent portions of the socket-engaging means.

4. A snap fastener device of the class described formed from a single piece of yieldable sheet metal and having a pair of arms A and B connected at one end, said arms having curved portions 1 and 2 opposite each other adjacent to the free ends of the arms A and B for receiving and holding a conduit, one of said arms bent into a diverging portion 8 with relation to the other to snap through an aperture in a supporting structure and a hook portion 7 located between the diverging portion and one of the curved portions for engagement with the supporting structure adjacent to the aperture therein.

5. A spring fastener comprising a strip of metal bent adjacent the midportion thereof to provide two arms, each arm having a shoulder for engaging a support and having the outer ends thereof bent to receive an article.

CARL L. KNUTSON.